United States Patent [19]
Wentzel

[11] 3,942,663

[45] Mar. 9, 1976

[54] DUMP ELEVATOR

[75] Inventor: Roger D. Wentzel, Rochester, Mich.

[73] Assignee: Planet Corporation, Troy, Mich.

[22] Filed: Jan. 10, 1975

[21] Appl. No.: 540,215

[52] U.S. Cl. .................. 214/313; 187/17; 214/622; 214/707

[51] Int. Cl.$^2$ .......................................... B65G 65/04

[58] Field of Search .......... 187/1, 17; 214/313, 315, 214/316, 317, 620, 621, 707, 622, 38 CC

[56] References Cited

UNITED STATES PATENTS

| | | | |
|---|---|---|---|
| 3,279,635 | 10/1966 | Avery et al. | 214/313 |
| 3,528,577 | 9/1970 | Rose | 214/313 |

*Primary Examiner*—Robert J. Spar
*Assistant Examiner*—Lawrence J. Oresky
*Attorney, Agent, or Firm*—Gifford, Chandler & Sheridan

[57] ABSTRACT

A dump elevator for use in conjunction with a fork lift truck and adapted to lift a load received from the fork lift truck to an elevated position and to subsequently dump the load through a chute into a receiving bin. The dump elevator comprises an upright frame having an upper and lower arcuate track disposed along two opposing sides of the frame. A carriage is disposed within the frame in an elevated position and includes rollers which are received and guided by the upper and lower tracks. A pusher assembly is disposed underneath and connected to the carriage so that after the fork lift truck has placed a load onto the carriage, the fork lift truck can then be used to lift the pusher assembly and thus raise the carriage. As the carriage is lifted the upper and lower tracks guide the travel of the carriage and simultaneously tilt the carriage so as to dump the load from the carriage when the carriage reaches a point near its apogee.

6 Claims, 3 Drawing Figures

DUMP ELEVATOR

BACKGROUND OF THE INVENTION

1. Field of the Invention

The present invention relates generally to dump elevators and more particularly to a dump elevator adapted to receive a load from a fork lift truck wherein the fork lift truck is then used to raise and dump the load.

2. Prior Art

Dump elevators, including dump elevators for use in conjunction with fork lift trucks or the like, are well known and are often used in manufacturing operations, warehousing operations, and the like. Previously known dump elevators typically comprised a carriage adapted to receive a load from the fork lift truck. After the load is placed onto the carriage, power means are actuated to lift the carriage to an elevated position and then to subsequently dump the load into a bin or the like. Dump elevators are typically utilized where it is desired to lift and dump the load at an elevated position higher than is obtainable by the limited travel of the rack of the fork lift truck.

A major disadvantage of previously known dump elevators is that such elevators are extremely expensive to construct or purchase. One of the primary reasons for the high cost of previously known dump elevators is that the drive or power means to lift the carriage in the elevator, typically electric or pneumatic motors, are very expensive not only to produce but also to maintain. An associated problem of such previously known dump elevators is that the electric or pneumatic drive means often fail due to the relative complexity of the drive means. Needless to say, failure of the drive means renders the dump elevator inoperative, thus resulting in expensive work stoppages.

SUMMARY OF THE INVENTION

The present invention eliminates the above mentioned disadvantages of the previously known dump elevators by utilizing the fork lift truck as the power means to lift the carriage in the dump elevator rather than the previously known separate drive means which are attached to the dump elevator. In this manner not only are the construction and maintenance costs of the dump elevator greatly reduced, but also expensive work stoppages caused by failure of the dump elevator drive means are entirely eliminated.

The dump elevator of the present invention generally comprises an upright frame having a pair of facing upper tracks disposed along two opposing sides of the frame and likewise a pair of lower facing tracks one of which is disposed under each upper track. A carriage, adapted to receive a load thereon, is disposed substantially within the frame of the dump elevator and includes rollers which extend from the side of the carriage and are received in the upper and lower tracks on both sides of the dump elevator frame. A pusher assembly is pivotally secured to and disposed underneath the carriage. The pusher assembly serves not only to maintain the carriage in an elevated position when not in use, but also the pusher assembly is engageable by the fork lift truck to lift the carriage around the upper and lower tracks on the dump elevator frame.

In operation the fork lift truck places a load on the elevated carriage. The rack of the fork lift truck is then lowered to engage the pusher assembly. The fork lift truck then raises the pusher assembly which simultaneously raises the carriage with the load. The upper and lower track are arcuate in form so that as the carriage is lifted, the carriage will simultaneously tilt and dump the load when the carriage reaches a point near its apogee.

BRIEF DESCRIPTION OF THE DRAWINGS

The present invention will be more clearly understood by reference to the following detailed description when read in conjunction with the attached drawings wherein like reference characters refer to like parts throughout the several views, and in which.

DETAILED DESCRIPTION OF THE PREFERRED EMBODIMENT

Figure 1:
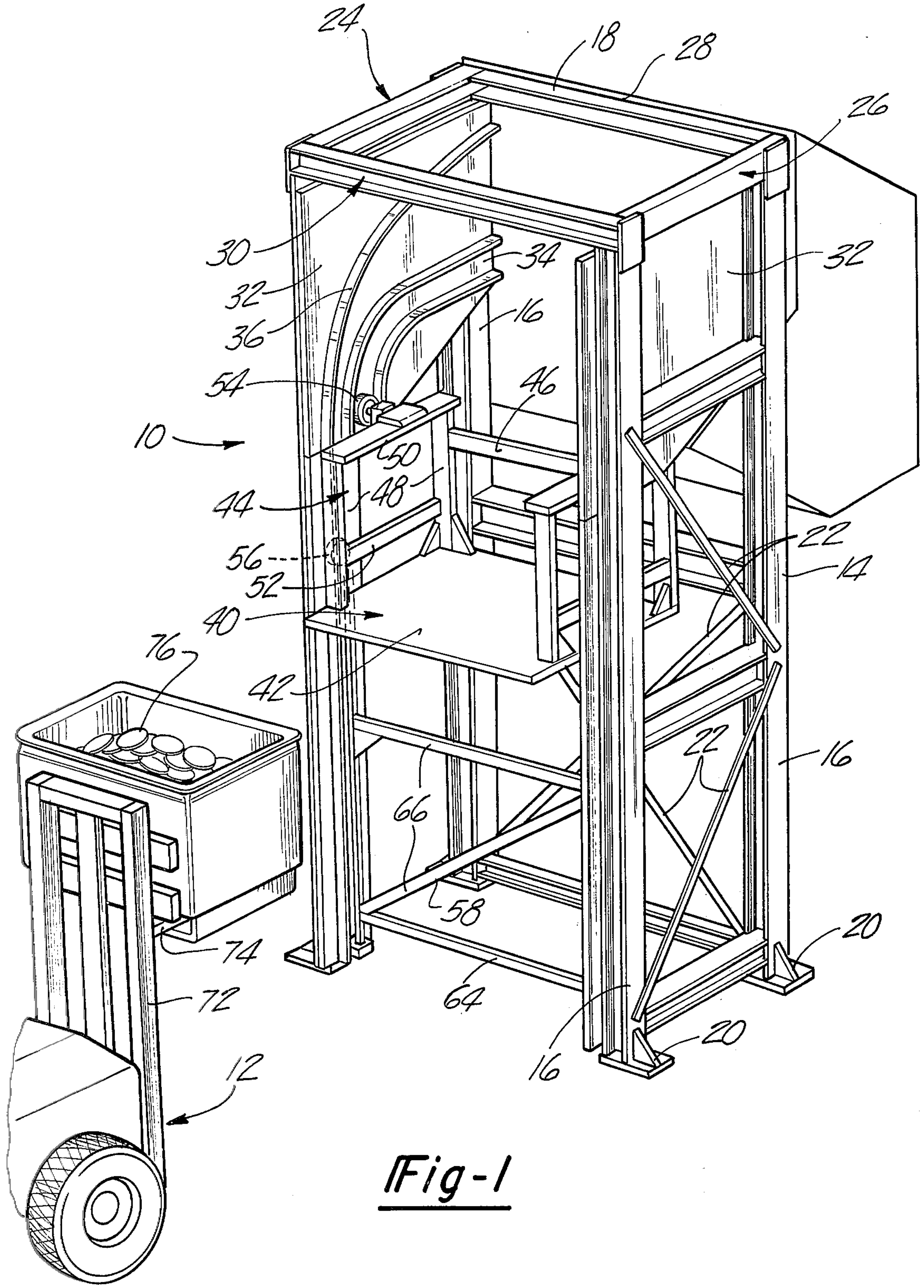
FIG. 1 is a perspective view showing the dump elevator of the present invention.

Referring now to FIG. 1, the dump elevator of the present invention, generally indicated by the numeral 10, is shown for use in conjunction with a fork lift truck 12 or the like. The dump elevator 10 generally comprises a frame 14 having vertical support members 16 and horizontal support members 18. The vertical and horizontal support members 16 and 18, respectively, are preferably of I-beam construction and in addition are preferably secured to each other by welding although any conventional attachment means may be used. In addition a foot 20 is preferably secured at the base of each vertical support member 16 for additional stability of the frame 14. Similarly cross members 22 may be disposed between and secured to adjacent vertical support members 16 for increased rigidity of the frame 14.

Figure 3:
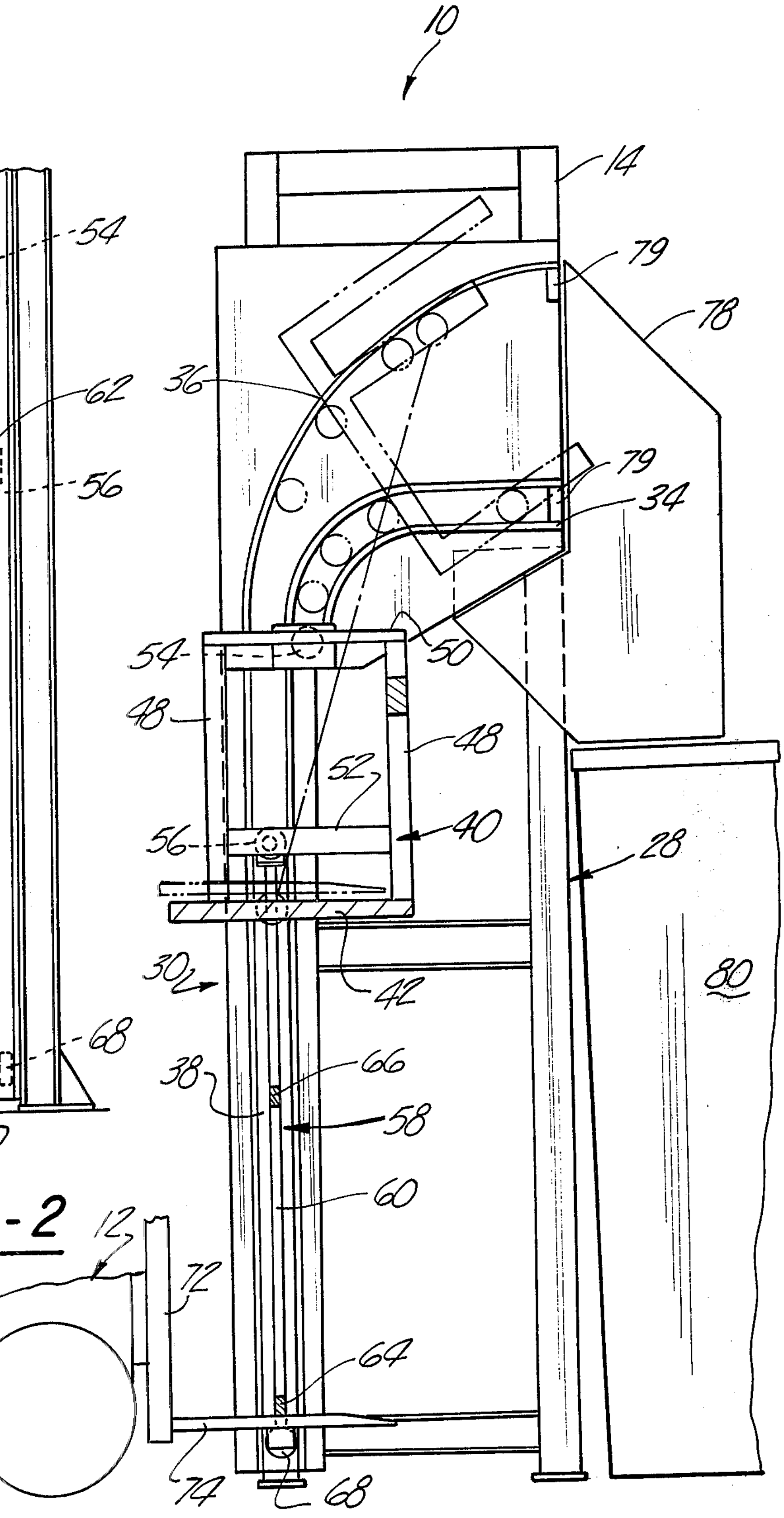
FIG. 3 is a partial side cross sectional view of the dump elevator of the present invention.

For ease of description only, side 24 will be referred to as the left side of the frame 14, side 26 will be referred to as the right side of the frame 14, side 28 as the back of the frame 14, and side 30 as the front of the frame 14. A pair of plates 32 are secured across the upper portions of the sides 24 and 26 on the interior of the frame 14 by any conventional means, such as welding, riveting, or the like. A lower arcuate track 34 having a C-shaped cross section is secured to the interior side of each plate 32. The track 34 is generally horizontal near the back side 28 of the frame 14 and curves downwardly to nearly a vertical orientation near the front 30 of the frame 14. An upper track 36 is also secured to each plate 32 above the lower track 34. The upper track 36 is generally horizontal near the back side 28 of the frame 14, and like the lower track 34, curves downwardly to a generally vertical orientation near the front side 30 of the frame 14. In addition the upper track 36, unlike the lower track 34, comprises only a flange from its rear horizontal position to its front vertical orientation. As shown in FIG. 3 the lower vertical portion 38 of the upper track is C-shaped in plan similar to the lower track 34. Still referring to FIG. 3 it can be seen that the lower track 34 terminates at a point above the center of the frame 14 whereas the upper track 38 extends substantially from the bottom of the frame 14 to the top of the frame. The upper track 36 and the lower track 34 along the right side 26 of the frame 14 are substantially identical to the above described tracks 34 and 36 and are in spaced, facing relationship to the tracks 34 and 36 on the left hand side 30 of the frame 14. Thus for brevity the tracks along the right hand side 26 of the frame 14 will not be further described.

A carriage 40 is disposed between the right hand side 26 and the left hand 24 of the frame 14 and includes a platform 42, side rail members 44, and a front cross member 46. Each of the side rail members 44 includes two vertical sections 48 and an elevated horizontal section 50 secured across the top of the two vertical sections 48. Additional horizontal cross members 52 may also be provided along the side rail members 44 for stability and increased rigidity. The precise construction of the side rail members 44 and the front cross member 46 of the carriage 40 is not crucial to the invention and conventional attachment means and the like may be utilized to secure the rail members 44 to the platform 42.

Figure 2:
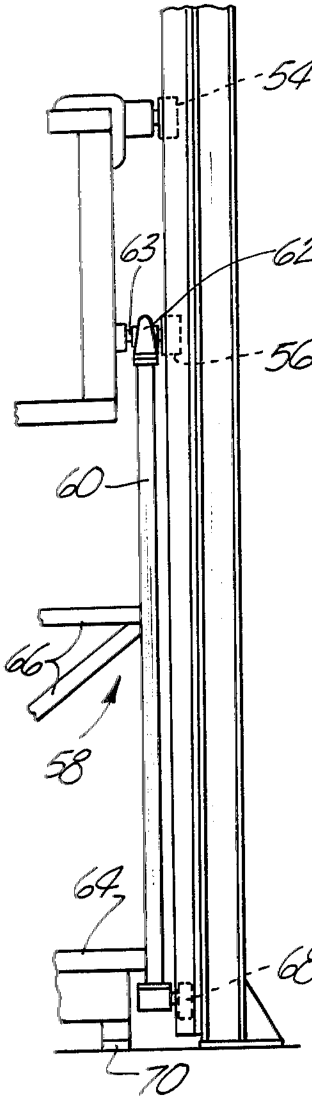
FIG. 2 is a partial front elevational view showing a portion of the dump elevator of the present invention.

Referring now to FIGS. 1–3, it will be seen that two guide members or rollers 54 and 56 are attached to and protrude laterally outwardly from each side rail member 44 of the platform 40. Preferably the rollers 54 and 56 include bearings, (not shown) so that the rollers 54 and 56 may rotate freely around their axes. Referring to FIG. 3 the roller 54 is rotatably attached to the upper horizontal section 50 of the rail 44 at about the midpoint of the section 50. The roller 56 is rotatably attached to the lower horizontal cross member 52 and is also positioned closer to the front side 30 of the frame 14 than the roller 54. Thus, for a reason to be later more fully described, the roller 54 is located not only above the roller 56 but also the roller 54 is horizontally displaced toward the rear side 28 of the frame 14 relative to the roller 56.

A pusher assembly 58 is disposed underneath and pivotally connected to the carriage 40. The pusher assembly 58 generally comprises a pair of parallel, spaced vertical members 60 having an upper bearing 62 pivotally connected to a shaft 63 which is the axis of roller 56. A horizontal pusher bar 64 is disposed between and attached to the lower end of the vertical members 60. In addition, additional cross members 66 may also be provided to add rigidity to the pusher assembly 58. The lower end of the vertical members 60 of the pusher assembly 58 includes a roller 68 laterally protruding from each side of the pusher assembly 58. The roller 68 is received in the lower portion 38 of the upper track 36.

Lastly, the pusher assembly 58 includes a foot member 70 (FIG. 2) secured to the pusher bar 64. The foot member 70 engages the ground and protects the lower roller 68 and the vertical member 60 from damage. It should also be apparent that the pusher assembly 58 as thus far described maintains the carriage 40 in an elevated position above the ground by way of the feet 70 and the vertical members 60. The operation of the present invention may now be described.

Referring first to FIG. 1, the fork lift truck 12 is of the conventional type having a front rack 72 and forwardly projecting forks 74 which are vertically movable along the rack 72. The truck 12 carries a container 76 in an elevated position on the rack and places the container 76 on the platform 42 of the carriage 40. Preferably, the vertical elevation of the platform 42 is such that the forks 74 of the truck 12 must be elevated to near their most vertical extension in order to permit placement of the container 76 on the platform 42. After the container 76 is placed on the platform 42 by the fork lift truck 12, the truck 12 is retracted or backed away from the dump elevator 10. The forks 74 are then lowered on the rack 72 and the fork lift truck 12 is then advanced toward the dump elevator 10 so that the forks 74 are positioned beneath the pusher bar 64 of the pusher assembly 58 as shown in FIG. 3.

Still referring to FIG. 3, the forks 74 of the fork lift truck 12 are then lifted thus forcing the pusher assembly 58 with the attached carriage 40 upwardly with the upward travel of the forks 74. As the carriage 40 moves upwardly, the travel of the carriage 40 is guided by the rollers 68 and 56 which are received in the upper track 36 and by the roller 54 which is received in and guided by the lower track 34. As previously described, the roller 56, to which the pusher assembly 58 is connected, is located below and nearer the front side 30 of the frame 14 than the roller 54. Thus as the pusher assembly 58 forces the roller 56 upwardly along the upper track 36, the roller 56 will attain a position above the rolling 54 thereby causing the carriage 40 to pivot in a clockwise position as viewed in FIG. 3. The curvature of the tracks 34 and 36 is designed so that as the carriage 40 reaches a point near its apogee, as shown in phantom lines in FIG. 3, the carriage 40 will dump the load from within the container 76 out of the back side 28 of the frame 14. Stops 79 (FIG. 3) prevent the container 76 from following the contents thereof. A chute 78 may be attached to the dump elevator 10 to receive the contents of the container 76. Likewise a bin 80 is shown in a position to receive the contents of the container 76 as it exits from the chute 78. The chute 78 and bin 80, of course can be replaced by any means for receiving the load from the container 76. After the container 76 is dumped, the forks 74 of the fork lift truck 12 are lowered thus returning the carriage 40 and the empty container 76 to the lowermost position. The fork lift truck 12 is then removed and the empty container 76 is removed from the carriage 40. The dump elevator 10 is now ready to receive another container 76 for dumping.

The present invention thus provides a dump elevator for use in conjunction with a fork lift truck 12 which is both simple in construction and virtually maintenance free. The fork lift truck 12 eliminates the need for expensive and failure prone drive means of previously known dump elevators. It should also be noted, as best shown in FIG. 3, that the dump elevator 10 of the present invention is capable of lifting a container 76 to a vertical elevation greatly in excess of the vertical elevation which may be achieved by the fork lift truck 12 alone. Thus for example, the bin 80 may be of such height that a fork lift truck alone could not place a load into the bin 80.

Having thus described my invention many modifications thereto will become apparent to those skilled in the art to which the present invention pertains without deviating from the spirit of the invention as defined by the scope of the appended claims.

What is claimed is:

1. In combination, a dump elevator and a fork lift truck, said dump elevator comprising:

a frame;

an upper track and a lower track attached to said frame along each of two facing sides of said frame, a carriage disposed within said frame, said carriage having guide members which are received by said upper and lower tracks, said carriage adapted to receive a load from said fork lift truck, and a pusher assembly disposed underneath and connected to said carriage, said pusher assembly adapted to maintain said carriage in an elevated position and including a pusher bar adapted to be engaged and elevated by the forks of said fork lift truck, and said upper and lower tracks being arcuate in shape so that said carriage pivots as the carriage is lifted by the fork lift truck.

2. The combination as defined in claim 1 wherein said guide members are rollers.

3. The combination defined in claim 1 wherein the load is dumped from the carriage when the carriage reaches a point near its apogee.

4. The combination defined in claim 1 wherein the pusher assembly comprises a pair of spaced and substantially parallel vertical members pivotly connected to said carriage at their upper ends, said pusher bar being horizontally disposed across the lower ends of said vertical members, and a pair of rollers laterally protruding from the lower ends of said vertical members, said rollers being received in and guided by the lower portion of said upper track.

5. The combination as defined in claim 1 and in which said carriage is adapted to receive a container, said container being moved to a tipped position upon upward movement of said carriage to dump the contents thereof.

6. The combination as defined in claim 5 and in which said carriage is spaced upwardly from the forks of said fork lift truck.

* * * * *